United States Patent
Lendaro

[11] Patent Number: 5,345,275
[45] Date of Patent: Sep. 6, 1994

[54] COLOR TEMPERATURE SELECTION CIRCUITRY HAVING COLOR MATRIX CORRECTION

[75] Inventor: Jeffery B. Lendaro, Noblesville, Ind.

[73] Assignee: Thomson Consumer Electronics, Inc., Indianapolis, Ind.

[21] Appl. No.: 15,241

[22] Filed: Feb. 4, 1993

[51] Int. Cl.⁵ .............................................. H04N 9/64
[52] U.S. Cl. ................................... 348/656; 348/655
[58] Field of Search ......................... 358/29, 28, 27; 348/655, 656, 657; H04N 9/64

[56] References Cited

U.S. PATENT DOCUMENTS

| | | | |
|---|---|---|---|
| 3,919,712 | 11/1975 | Izumisawa et al. | 358/29 |
| 4,365,265 | 12/1982 | Isujita et al. | 358/29 |
| 5,132,825 | 7/1992 | Miyadera | 358/29 |

FOREIGN PATENT DOCUMENTS 150688 5/1992 Japan ............................ H04N 9/64

OTHER PUBLICATIONS

Relevant portion of CTC-170 Schematic.

Primary Examiner—James J. Groody
Assistant Examiner—Glenton B. Burgess
Attorney, Agent, or Firm—Joseph S. Tripoli; Peter M. Emanuel; Thomas F. Lenihan

[57] ABSTRACT

In a television receiver including a feature allowing a user to select a color temperature at which whites will be produced on a display screen, circuitry is provided for altering the gain of the red and blue kine driver stages and simultaneously automatically altering the gain of the R−Y and B−Y color difference signal amplifier, to correct for errors which would otherwise be introduced by adversely altering the B−Y/R−Y ratio.

4 Claims, 2 Drawing Sheets

COLOR TEMPERATURE SELECTION CIRCUITRY HAVING COLOR MATRIX CORRECTION

FIELD OF THE INVENTION

This invention concerns color television receivers in general and especially those color television receivers having circuitry for selecting different color temperature settings.

BACKGROUND OF THE INVENTION

In recent years it has become fashionable for high-end television receivers to include, in a menu, a feature in which a user may select one of several color temperature settings. Such a television receiver is the RCA CTC-170 color television receiver chassis, manufactured by Thomson Consumer Electronics, Inc., Indianapolis, Ind. The term "color temperature" refers to the degree of "whiteness" of white-colored areas of a picture displayed on a television display screen, relative to a given standard. Three standard light sources were chosen for measurement purposes; they are known as illuminant A, illuminant B, and illuminant C. Illuminant A is a tungsten filament incandescent lamp operating at 2500 degrees Kelvin. A white picture area which matches the particular shade of white light produced by this standard illumination source is said to have a color temperature of 2500 degrees. Illuminant B was selected to give an approximation of direct sunlight and was achieved by filtering the light from the tungsten lamp to produce a color equal to 4800 degrees Kelvin. Illuminant C filters the tungsten light to produce a color equal to 6500 degrees Kelvin, and is felt to produce a closer approximation of sunlight than Illuminant B. Illuminant C is the light source which was selected by the NTSC as a reference white for color television purposes. If the blue content of the white light is increased, the color temperature is raised, and the whites appear somewhat "whiter" to the human eye. If the red content of the white light is increased, the color temperature is lowered, and the whites appear somewhat "softer" to the human eye. Curiously, the perception of viewers is that as the color temperature is raised by adding a little more blue, the whites seem "cooler". Similarly, the perception of viewers is that as the color temperature is lowered by adding a little more red, the whites seem "warmer".

The NTSC color television system is based on the abovenoted specific color temperature and a specific set of very outdated picture tube phosphors. For example, a prior color matrix, produced by the former RCA Corporation, was designed for whites at 6500 degrees and exhibits a $B-Y/R-Y$ ratio of 1.2. If a different color temperature, or different phosphors, are used, then color errors will exist. The color matrix can be designed to place these errors in the least conspicuous places. In recent years, the trend has been to increase color temperature in order to display "whiter" whites. For example, a known system is designed to display whites at 9300 degrees Kelvin and has a fixed $B-Y/R-Y$ ratio of 1.1. To accomplish this, the color temperature is generally changed by altering the red or blue kine (i.e., picture tube) driver gain. This changes the ratio between red, green, and blue, and therefore the color temperature of white.

Unfortunately, in a television receiver in which color temperature is user-selectable, if the blue driver gain is increased to raise the color temperature, the magnitude of the $B-Y$ color difference signal is also increased, which adversely alters the $B-Y/R-Y$ ratio, causing colors near red to have too much blue content. and to appear magenta or purple. Similarly, if the red driver gain is reduced to raise the color temperature, the magnitude of the $R-Y$ color difference signal is also reduced, which also adversely alters the $B-Y/R-Y$ ratio, causing colors near red to have too much blue content, and to appear magenta or purple.

SUMMARY OF THE INVENTION

In a television receiver including a feature allowing a user to select a color temperature at which whites will be produced on a display screen, circuitry is provided for altering the gain of the red and blue kine driver stages and simultaneously automatically altering the gain of the $R-Y$ and $B-Y$ color difference signal amplifier, to correct for errors which would otherwise be introduced by adversely altering the $B-Y / R-Y$ ratio.

DETAILED DESCRIPTION OF THE DRAWING

Figure 1:
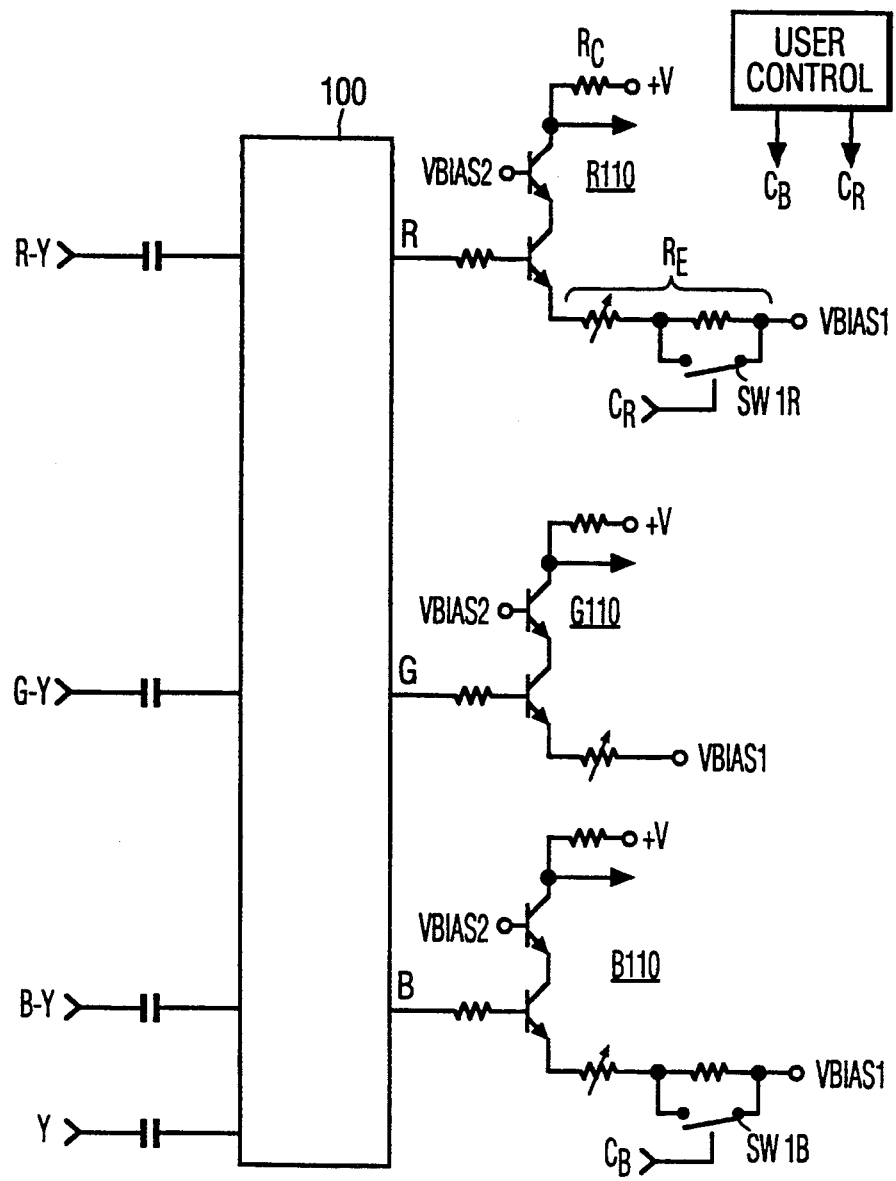
FIG. 1 is a simplified block diagram of a portion of a television receiver, known from the prior art, showing color processing circuitry.

Referring to prior art FIG. 1, a television receiver includes a color processing integrated circuit 100, (such as a TA 7730 RGB IC) including a color difference matrix unit which receives color difference signals $R-Y$, $G-Y$, and $B-Y$, and a luminance signal Y, and produces therefrom color signals R, G, and B for application to the cathodes of a color television picture tube (i.e., kine) (not shown) via respective kine driver amplifiers, generally designated R 110, G 110, and B 110, respectively.

The gain of each of kine driver amplifiers R110, G110, and B110 is approximately equal to $R_C/R_E$. Note that the emitter resistance $R_E$ of amplifier R110 comprises two series coupled resistors, VR113 (i.e., the red drive potentiometer), and R114 which is in parallel with a switch, SW 1R. A similar arrangement in amplifier B110 includes a switch SW 1B. Closing switch SW 1B bypasses its associated resistor, thereby lowering the emitter resistance $R_E$, and raising the color temperature by increasing the gain of blue kine driver amplifier B 110. Conversely, closing switch SW 1R bypasses its associated resistor, thereby lowering the emitter resistance $R_E$, and lowering the color temperature by increasing the gain of red kine driver amplifier R 110. Switches SW 1R, and SW 1B operate in a mutually exclusive fashion. Circuitry similar to that of FIG. 1 is known from the abovementioned RCA CTC-170 color television chassis. In that chassis. switches SW 1R and SW 1B are electronic switches controlled in response to a menu selection performed by a user. As noted above, the "warm" setting is actually at a lower color temperature, and approximates the old 6500 degree temperature. The "normal" setting is approximately 9300 degrees Kelvin, and the "cool" setting is actually at the highest color temperature of approximately 11,000 degrees Kelvin. Note that the colorimetry of the system of FIG. 1 is optimized only for the normal setting, with color errors increasing on both the warm and cool settings due to changes in the B−Y/R−Y ratio caused by altering the gain of the kine driver amplifiers.

Figure 2:
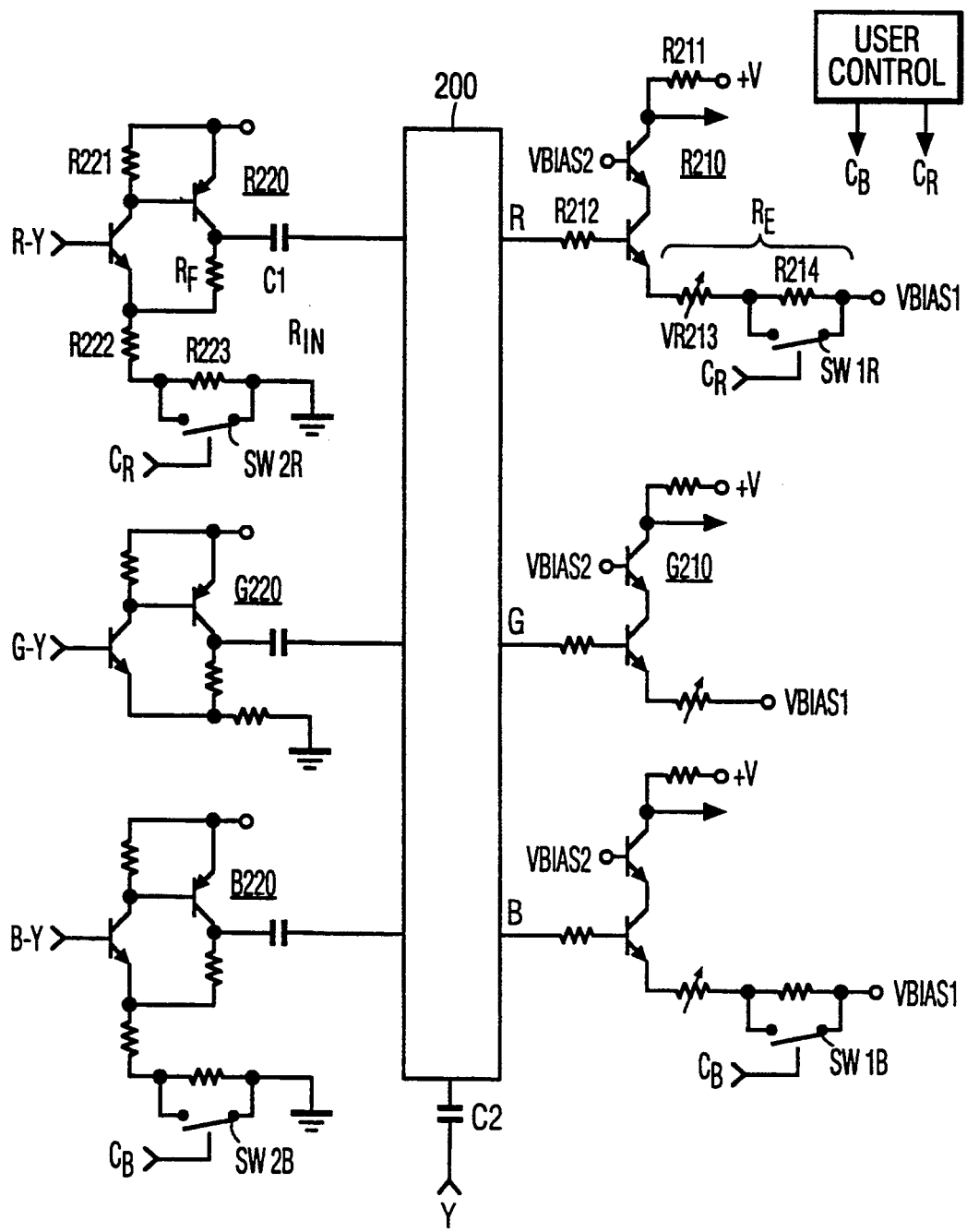
FIG. 2 is a simplified block diagram of a portion of a television receiver showing color processing circuitry according to the subject invention.

Referring to FIG. 2, a television receiver according to the subject invention includes a color processing integrated circuit 200 including a color difference matrix unit which receives color difference signals R−Y, G−Y, and B−Y, and a luminance signal Y, and produces therefrom color signals R, G, and B for application to the cathodes of a color television picture tube (i.e., kine) (not shown) via respective kine driver amplifiers, generally designated R210, G210, and B210, respectively.

The gain of each of kine driver amplifiers R210, G210, and B210 is approximately equal to $R_C/R_E$. Note that the emitter resistance $R_E$ of amplifiers R210 and B210 comprises two series-coupled resistors VR213 (i.e., the red drive potentiometer), and R214 which is in parallel with a switch, SW 1R. A similar arrangement in amplifier B210 includes the blue drive potentiometer, and a switch SW 1B. Closing switch SW 1B bypasses its associated resistor, thereby lowering the emitter resistance $R_E$, and raising the color temperature by increasing the gain of blue kine driver amplifier B210. Conversely, closing switch SW 1R bypasses its associated resistor, thereby lowering the emitter resistance $R_E$, and lowering the color temperature by increasing the gain of red kine driver amplifier R210. Just as in FIG. 1, switches SW 1R, and SW 1B operate in a mutually exclusive fashion. Switches SW 1R and SW 1B are shown in simplified fashion, and are intended to be electronic switches controlled in response to a menu selection performed by a user. As noted above, the "warm" setting is actually at a lower color temperature, and approximates the old 6500 degree temperature. The "normal" setting is approximately 9300 degrees Kelvin, and the "cool" setting is actually at the highest color temperature of approximately 11,000 degrees Kelvin. FIG. 2 also shows color difference amplifiers R220, G220, and B220. In order to compensate for color errors which would otherwise be introduced by changing the gain of the kine driver stages, the subject invention also alters the gain of a respective one of the color difference amplifiers R220, and B220.

The gain of each of color difference amplifiers R220, G220, and B220 is approximately equal to $(R_F+R_{IN})/R_{IN}$. Note that the resistance $R_{IN}$ of amplifiers R220 and B220 comprises two series-coupled resistors, one of which is in parallel with a switch, SW 2R, and SW 2B, respectively. In normal operation, switches SW 2R and SW 2B are closed, and switches SW 1R and SW 1B are open. Switch SW 2R is operated inversely to its companion switch SW 1R, switch SW 2B is operated inversely to its companion switch SW 1B. Opening switch SW 2R places its associated resistor in series with the other emitter resistor, thereby raising the emitter resistance $R_E$, and providing the proper ratio of B−Y to R−Y for the selected color temperature by decreasing the gain of R−Y color difference amplifier R220. Conversely, opening switch SW 2B places its associated resistor in series with the other emitter resistor, thereby raising the emitter resistance $R_E$, and providing the proper ratio of B−Y to R−Y for the selected color temperature by decreasing the gain of B−Y color difference amplifier B220. For a color temperature of 6500 degrees Kelvin (i.e., "warm"), a suitable B−Y/R−Y ratio has been found to be 1.2. For a color temperature of 9300 degrees Kelvin (i.e., "normal"), a suitable B−Y/R−Y ratio has been found to be 1.1. For a color temperature of 11,000 degrees Kelvin (i.e., "cool"), a suitable B−Y/R−Y ratio has been found to be in the range of 1.0 to 1.05. The subject invention tends to optimize the colorimetry for all color temperature settings by automatically providing the proper B−Y/R−Y ratio for each selected color temperature. Suitable values for the components R−Y color difference amplifier R220 of FIG. 2 are:

| | |
|---|---|
| C1 = 0.1 microfarads | R221 = 10 kilohms |
| $R_F$ = 2200 ohms | R222 = 2200 ohms |
| R223 = 470 ohms | |
| C2 = 1.0 microfarads | |

Values for the components of G−Y color difference amplifier G220 are identical to corresponding components of R−Y color difference amplifier R220.

Values for the components of B−Y color difference amplifier B220 are identical to corresponding components of R−Y color difference amplifier R220.

Suitable values for the components red kine driver amplifier R210 of FIG. 2 are:

R211=4700 ohms
R212=100 ohms
VR213=150 ohms
R214=18 ohms

Values for the components of green kine driver amplifier G210 are identical to corresponding components of red kine driver amplifier R210.

Values for the components of blue kine driver amplifier B210 are identical to corresponding components of red kine driver amplifier R210.

What is claimed is:

1. In a color television system, apparatus comprising:
   means for altering the gain of one of a red color signal amplifier and a blue color signal amplifier to affect the temperature of a white area displayed on a display screen; and
   means for controlling the gain of a respective one of an R−Y color difference amplifier and a B−Y color difference amplifier concurrently and in the opposite sense to the alternation of the gain of said one of said red color signal amplifier and said blue color signal amplifier.

2. The system of claim 1, wherein:
   said gain-altering means of said red color signal amplifier and said blue color signal amplifier comprises a switch for reducing the emitter resistance of one of said red color signal amplifier and said blue color signal amplifier.

3. The system of claim 2, wherein:
   said gain-altering means of said R−Y color difference amplifier and a B−Y color difference amplifier comprises a switch for reducing the emitter resistance of one of said R−Y color difference amplifier and a B−Y color difference amplifier.

4. The system of claim 3, wherein:
   said switch for reducing the emitter resistance of said B−Y color difference amplifier and said switch for reducing the emitter resistance of said blue color signal amplifier operate substantially simultaneously and inversely.

* * * * *